(12) United States Patent
Iwakura et al.

(10) Patent No.: US 9,337,673 B2
(45) Date of Patent: May 10, 2016

(54) BATTERY CHARGING APPARATUS AND METHOD OF CONTROLLING BATTERY CHARGING APPARATUS

(71) Applicant: SHINDENGEN ELECTRIC MANUFACTURING CO., LTD., Chiyoda-Ku (JP)

(72) Inventors: Tokihiko Iwakura, Hanno (JP); Makoto Tabuta, Hanno (JP)

(73) Assignee: Shindengen Electric Manufacturing Co., Ltd., Tokyo (JP)

(*) Notice: Subject to any disclaimer, the term of this patent is extended or adjusted under 35 U.S.C. 154(b) by 221 days.

(21) Appl. No.: 14/346,580

(22) PCT Filed: Jun. 4, 2013

(86) PCT No.: PCT/JP2013/065421
§ 371 (c)(1),
(2) Date: Mar. 21, 2014

(87) PCT Pub. No.: WO2014/196012
PCT Pub. Date: Dec. 11, 2014

(65) Prior Publication Data
US 2015/0295434 A1 Oct. 15, 2015

(51) Int. Cl.
*H02J 7/00* (2006.01)
*H02J 7/04* (2006.01)
(Continued)

(52) U.S. Cl.
CPC ............ *H02J 7/0034* (2013.01); *H02J 7/0057* (2013.01); *H02J 7/0081* (2013.01); *H02J 7/022* (2013.01);
(Continued)

(58) Field of Classification Search
CPC ..... H02J 7/0034; H02J 7/0057; H02J 7/0081; H02J 7/022; H02J 7/042; H02J 2007/0039; H02J 2007/0059; H02J 2007/10

USPC .......................................................... 320/165
See application file for complete search history.

(56) References Cited

U.S. PATENT DOCUMENTS 2,142,653 A * 1/1939 Peterson .................. H04Q 3/58
379/228
3,063,002 A * 11/1962 Phelon .................. H02J 7/1484
318/499
(Continued)

FOREIGN PATENT DOCUMENTS

JP H05-030653 A 2/1993
JP 2005-137190 A 5/2005
(Continued)

OTHER PUBLICATIONS

International Search Report for PCT/JP2013/065421 mailed on Jul. 2, 2013.
(Continued)

*Primary Examiner* — Sun Lin
(74) *Attorney, Agent, or Firm* — Ladas & Parry, LLP (57) ABSTRACT

A battery charging apparatus that controls charging of a battery by an alternating-current generator, the battery charging apparatus has a first switch element connected to a first battery terminal to which a positive electrode side of the battery is connected in a normal connection of the battery at a first end thereof and to a first generator terminal to which a first output of the alternating-current generator is connected at a second end thereof, and a second switch element connected to the first battery terminal at a first end thereof and to a second generator terminal to which a second output of the alternating-current generator is connected at a second end thereof. In a case when a controlling circuit stops controlling the first switch element and the second switch element, and the first switch element and the second switch element are turned off, a detecting circuit, which detects a reverse connection condition of the battery, forcedly turns on at least one of the first switch element and the second switch element when the detecting circuit detects the reverse connection condition of the battery.

14 Claims, 5 Drawing Sheets

(51) Int. Cl.
*H02J 7/02* (2006.01)
*H02M 7/162* (2006.01)
*H02J 7/10* (2006.01)

(52) U.S. Cl.
CPC ......... *H02J 7/042* (2013.01); *H02J 2007/0039* (2013.01); *H02J 2007/0059* (2013.01); *H02J 2007/10* (2013.01); *H02M 7/1623* (2013.01)

(56) References Cited

U.S. PATENT DOCUMENTS

| 5,742,148 | A | * | 4/1998 | Sudo | H02J 7/0011 |
| | | | | | 320/118 |
| 5,841,265 | A | * | 11/1998 | Sudo | H02J 7/0011 |
| | | | | | 320/134 |
| 5,982,150 | A | * | 11/1999 | Sudo | H02J 7/0011 |
| | | | | | 320/136 |
| 6,097,177 | A | * | 8/2000 | Sudo | H02J 7/0026 |
| | | | | | 320/136 |
| 6,242,890 | B1 | * | 6/2001 | Sudo | H02J 7/0063 |
| | | | | | 320/127 |
| 8,120,884 | B2 | * | 2/2012 | Zhang | H02H 11/003 |
| | | | | | 361/118 |

FOREIGN PATENT DOCUMENTS

| JP | 2007-082374 A | 3/2007 |
| JP | 2009-118607 A | 5/2009 |
| JP | 2009-118608 A | 5/2009 |

OTHER PUBLICATIONS

International Preliminary Report on Patentability (Chapter I) for PCT/JP2013/065421 mailed on Dec. 17, 2015.
Written Opinion of the International Searching Authority for PCT/JP2013/065421 mailed on Jul. 2, 2013.

\* cited by examiner

BATTERY CHARGING APPARATUS AND METHOD OF CONTROLLING BATTERY CHARGING APPARATUS

CROSS-REFERENCE TO RELATED APPLICATION

This application is the U.S. National Stage of International Patent Application No. PCT/JP2013/065421 filed on Jun. 4, 2013, the disclosure of which is hereby incorporated by reference in its entirety.

TECHNICAL FIELD

The present invention relates to a battery charging apparatus and a method of controlling a battery charging apparatus.

BACKGROUND ART

Figure 3:
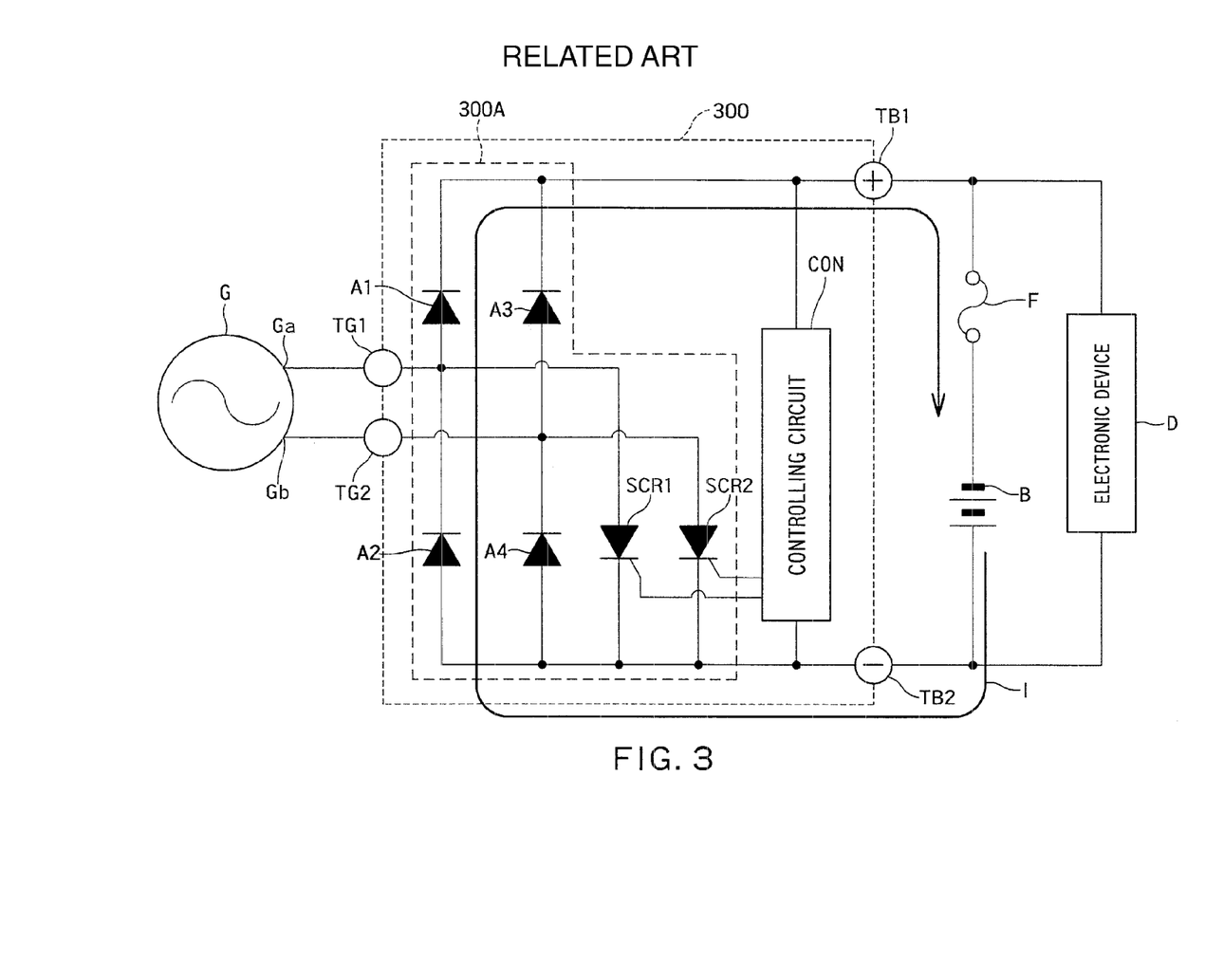
FIG. 3 is a circuit diagram showing an example of a configuration of a conventional battery charging apparatus.

In Japanese Patent Laid-Open Nos. 2009-118607 and 2009-118608, a conventional battery charging apparatus 300 incorporating a short-circuit regulator/rectifier is described (FIG. 3).

The conventional battery charging apparatus 300 includes a first generator terminal "TG1" to which a first output "Ga" of an alternating-current generator "G" is connected, and a second generator terminal "TG2" to which a second output "Gb" of the alternating-current generator "G" is connected. The battery charging apparatus 300 further includes a first battery terminal "TB1" to which a positive electrode side of a battery "B" is connected, and a second battery terminal "TB2" to which a negative electrode side of the battery "B" is connected, the battery "B" and a fuse "F" being connected in series with each other between the first battery terminal "TB1" and the second battery terminal "TB2".

The battery charging apparatus 300 further includes a rectifying circuit 300A that has four diodes "A1" to "A4" and two thyristors "SCR1" and "SCR2", rectifies an output current of the alternating-current generator "G" and outputs the rectified current to the first battery terminal "TB1".

The battery charging apparatus 300 further includes a controlling circuit "CON" that controls the thyristors "SCR1" and "SCR2" of the rectifying circuit "300A" to rectify the output current of the alternating-current generator "G".

With the conventional battery charging apparatus 300, when the battery "B" is reversely connected, a current "I" from the battery "B" flows to the fuse "F" through the rectifier (the diodes "A1" to "A4").

The current "I" makes the fuse "F" blow. As a result, application of a reverse voltage to an electronic device "D" is prevented.

Figure 4:
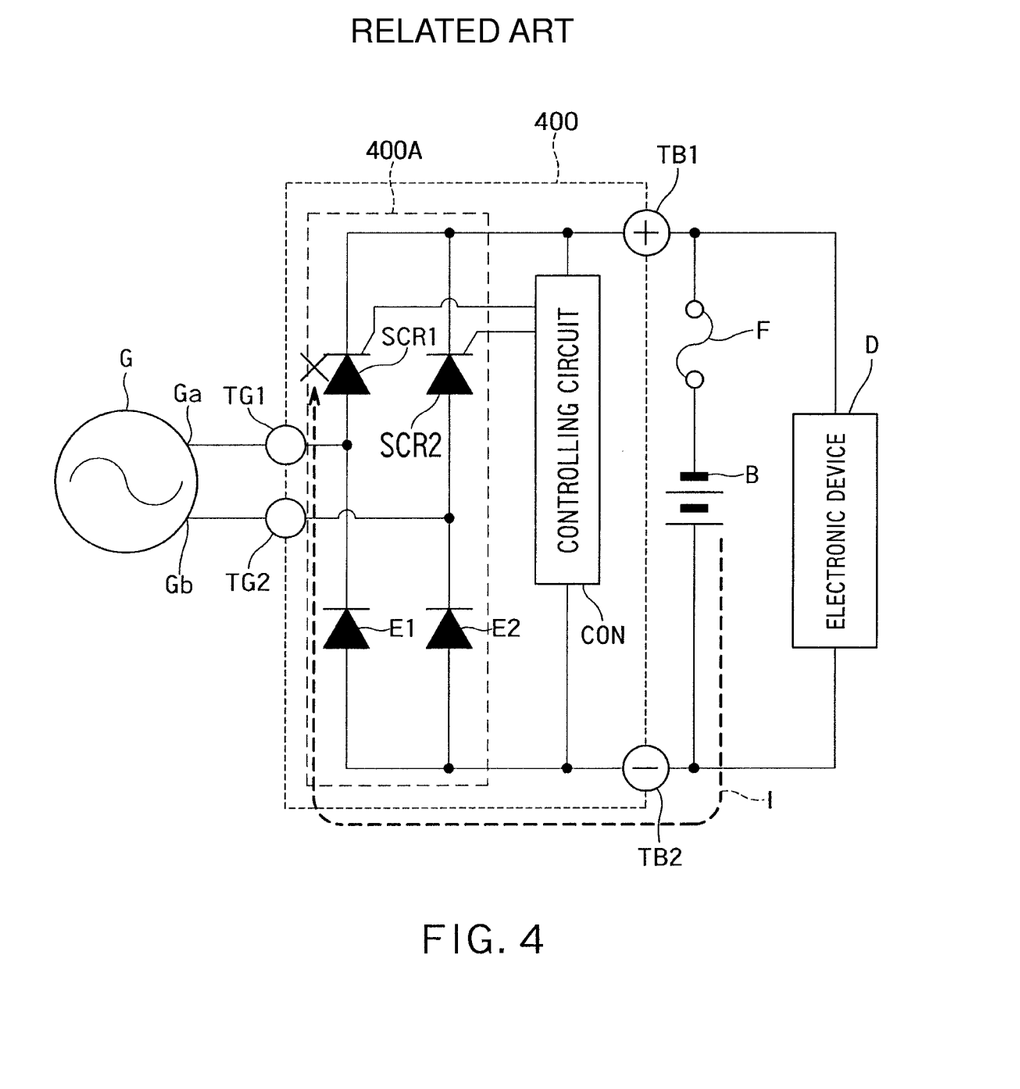
FIG. 4 is a circuit diagram showing another example of the configuration of the conventional battery charging apparatus.

On the other hand, there is a conventional battery charging apparatus 400 incorporating an open-circuit regulator/rectifier, for example (FIG. 4).

As with the battery charging apparatus 300 described above, the conventional battery charging apparatus 400 includes a first generator terminal "TG1", a second generator terminal "TG2", a first battery terminal "TB1" and a second battery terminal "TB2". The battery charging apparatus 400 further includes a rectifying circuit 400A that has two diodes "E1" and "E2" and two thyristors "SCR1" and "SCR2", rectifies an output current of an alternating-current generator "G" and outputs the rectified current to the first battery terminal "TB1". The battery charging apparatus 400 further includes a controlling circuit "CON" that controls the thyristors "SCR1" and "SCR2" of the rectifying circuit 400A to rectify the output current of the alternating-current generator "G".

In the battery charging apparatus 400, the rectifier part is formed by the thyristors "SCR1" and "SCR2". In a normal operation in which the output current of the alternating-current generator "G" is rectified, the thyristors "SCR1" and "SCR2" are turned on and off under the control of the controlling circuit "CON".

However, when the alternating-current generator "G" does not output a current (that is, does not revolve), the controlling circuit "CON" does not control the thyristors "SCR1" and "SCR2", and the thyristors "SCR1" and "SCR2" do not operate (that is, are in the off state) even if the battery "B" is reversely connected. In this case, when the battery "B" is reversely connected, there is no path through which a current "I" can flow to a fuse "F" (FIG. 4).

In other words, when the battery "B" is reversely connected, the fuse "F" does not blow. Therefore, a reverse voltage is applied to an electronic device "D".

Figure 5:
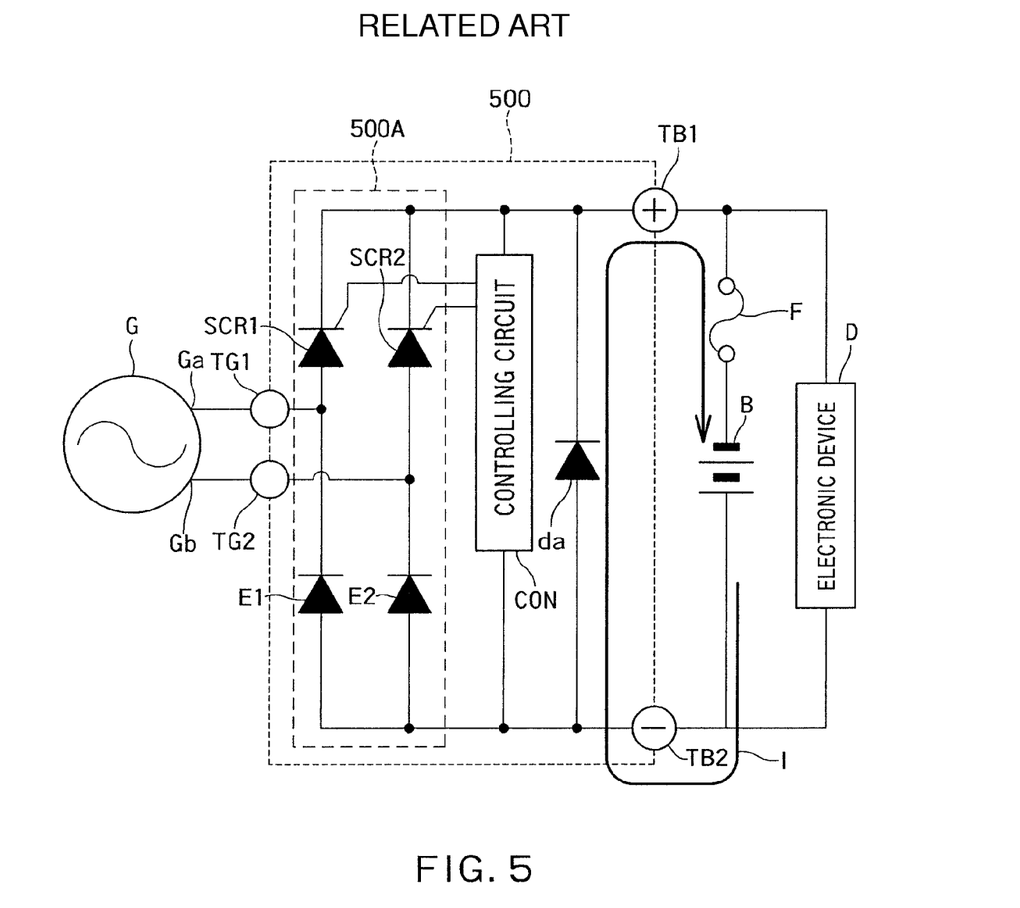
FIG. 5 is a circuit diagram showing another example of the configuration of the conventional battery charging apparatus.

Another conventional battery charging apparatus 500 incorporating an open-circuit regulator/rectifier differs from the conventional battery charging apparatus 400 described above in that it further includes an additional diode "da" that is connected to the first battery terminal "TB1" at a cathode thereof and to the second battery terminal "TB2" at an anode thereof (FIG. 5).

When the battery "B" is reversely connected, the additional diode "da" provides a path through which a current "I" can flow to a fuse "F".

The current "I" makes the fuse "F" blow. As a result, application of a reverse voltage to an electronic device "D" is prevented.

However, in the conventional battery charging apparatus 500 incorporating the open-circuit regulator/rectifier shown in FIG. 5 described above, the additional diode "da" has to have a current carrying capacity enough to withstand a current that makes the fuse "F" blow even though the diode is not used in the normal operation.

Thus, the additional diode "da" poses a problem that the manufacturing cost of the battery charging apparatus 500 increases.

A battery charging apparatus, according to an embodiment of an aspect of the present invention, being the battery charging apparatus that controls charging of a battery by an alternating-current generator, and the battery charging apparatus comprising:

a first generator terminal to which a first output of the alternating-current generator is connected;

a second generator terminal to which a second output of the alternating-current generator is connected;

a first battery terminal to which a positive electrode side of the battery is connected in a normal connection condition of the battery;

a second battery terminal to which a negative electrode side of the battery is connected in the normal connection condition of the battery, the battery and a fuse being connected in series with each other between the first battery terminal and the second battery terminal;

a rectifying circuit that has a first switch element connected to the first battery terminal at a first end thereof and to the first generator terminal at a second end thereof, a second switch element connected to the first battery terminal at a first end thereof and to the second generator terminal at a second end thereof, a first rectifying element connected to the first generator terminal at a first end thereof and to the second battery terminal at a second end thereof, and a second rectifying element connected to the second generator terminal at a first end thereof and to the second battery terminal at a second end thereof, rectifies an output current of the alternating-current generator and outputs the rectified current to the first battery terminal;

a detecting circuit that detects a reverse connection condition of the battery in which the negative electrode side of the battery is connected to the first battery terminal and the positive electrode side of the battery is connected to the second battery terminal, and controls either of the first switch element and the second switch element based on a result of the detection; and a controlling circuit that controls the first switch element and the second switch element of the rectifying circuit to rectify the output current of the alternating-current generator, wherein in a case where the controlling circuit stops controlling the first switch element and the second switch element, and the first switch element and the second switch element are turned off, the detecting circuit forcedly turns on at least one of the first switch element and the second switch element when the detecting circuit detects the reverse connection condition of the battery.

In the battery charging apparatus, the detecting circuit detects the reverse connection condition of the battery by detecting that a polarity of a voltage at the first battery terminal or the second battery terminal is different from the polarity in the normal connection condition.

In the battery charging apparatus, the detecting circuit detects the reverse connection condition of the battery by detecting that a magnitude of the voltage at the first battery terminal or the second battery terminal is equal to or greater than a preset threshold.

In the battery charging apparatus, in the case where the controlling circuit stops controlling the first switch element and the second switch element, and the first switch element and the second switch element are turned off, when the detecting circuit detects the reverse connection condition of the battery, the detecting circuit forcedly turns on either of the first switch element and the second switch element, thereby causing a current to flow to the fuse connected between the first battery terminal and the second battery terminal to make the fuse blow.

In the battery charging apparatus, the first switch element is a first thyristor connected to the first battery terminal at a cathode thereof and to the first generator terminal at an anode thereof, the second switch element is a second thyristor connected to the first battery terminal at a cathode thereof and to the second generator terminal at an anode thereof, the first rectifying element is a first rectifying diode connected to the first generator terminal at a cathode thereof and to the second battery terminal at an anode thereof, and the second rectifying element is a second rectifying diode connected to the second generator terminal at a cathode thereof and to the second battery terminal at an anode thereof.

In the battery charging apparatus, the detecting circuit has:

a Zener diode connected to the second battery terminal at a cathode thereof;

a first detecting diode connected to a gate of the first thyristor at a cathode thereof and to an anode of the Zener diode at an anode thereof; and a second detecting diode connected to a gate of the second thyristor at a cathode thereof and to the anode of the Zener diode at an anode thereof.

In the battery charging apparatus, the detecting circuit further has:

a first detecting resistor connected between the gate of the first thyristor and the cathode of the first detecting diode; and a second detecting resistor connected between the gate of the second thyristor and the cathode of the second detecting diode.

In the battery charging apparatus, an electronic device is connected in parallel with the fuse between the first battery terminal and the second battery terminal.

In the battery charging apparatus, in the case where the controlling circuit stops controlling the first switch element and the second switch element, and the first switch element and the second switch element are turned off, the detecting circuit forcedly turns on both the first switch element and the second switch element when the detecting circuit detects the reverse connection condition of the battery.

In the battery charging apparatus, the detecting circuit is driven by a current supplied from the battery reversely connected.

In the battery charging apparatus, the controlling circuit stops controlling the first switch element and the second switch element in a case where the alternating-current generator stops revolving and does not provide the output current.

In the battery charging apparatus, the controlling circuit is driven by at least the output current provided by the alternating-current generator.

In the battery charging apparatus, in the normal connection condition of the battery, the detecting circuit does not control the first switch element and the second switch element.

A method of controlling a battery charging apparatus, the battery charging apparatus comprising: a first generator terminal to which a first output of the alternating-current generator is connected; a second generator terminal to which a second output of the alternating-current generator is connected; a first battery terminal to which a positive electrode side of the battery is connected in a normal connection condition of the battery; a second battery terminal to which a negative electrode side of the battery is connected in the normal connection condition of the battery, the battery and a fuse being connected in series with each other between the first battery terminal and the second battery terminal; a rectifying circuit that has a first switch element connected to the first battery terminal at a first end thereof and to the first generator terminal at a second end thereof, a second switch element connected to the first battery terminal at a first end thereof and to the second generator terminal at a second end thereof, a first rectifying element connected to the first generator terminal at a first end thereof and to the second battery terminal at a second end thereof, and a second rectifying element connected to the second generator terminal at a first end thereof and to the second battery terminal at a second end thereof, rectifies an output current of the alternating-current generator and outputs the rectified current to the first battery terminal; a detecting circuit that detects a reverse connection condition of the battery in which the negative electrode side of the battery is connected to the first battery terminal and the positive electrode side of the battery is connected to the second battery terminal, and controls either of the first switch element and the second switch element based on a result of the detection; and a controlling circuit that controls the first switch element and the second switch element of the rectifying circuit to rectify the output current of the alternating-current generator, wherein in a case where the controlling circuit stops controlling the first switch element and the second switch element, and the first switch element and the second switch element are turned off, the detecting circuit forcedly turns on at least one of the first switch element and the second switch element when the detecting circuit detects the reverse connection condition of the battery.

A battery charging apparatus according to an aspect of the present invention includes a detecting circuit that detects a reverse connection condition of a battery in which a negative electrode side of the battery is connected to a first battery terminal and a positive electrode side of the battery is connected to a second battery terminal, and controls either of a first switch element and a second switch element based on a result of the detection.

And in a case where a controlling circuit stops controlling the first switch element and the second switch element, and the first switch element and the second switch element are turned off, the detecting circuit forcedly turns on at least one of the first switch element and the second switch element when the detecting circuit detects the reverse connection condition of the battery.

In this way, when the battery is reversely connected, a path through which a current can flow to a fuse "F" is provided. The current makes the fuse blow. As a result, application of a reverse voltage to an electronic device is prevented.

Furthermore, any additional diode or the like is not required to provide a path through which a current can flow to the fuse F when the battery is reversely connected. Therefore, the manufacturing cost of the battery charging apparatus can be reduced.

BEST MODE FOR CARRYING OUT THE INVENTION

In the following, an embodiment of the present invention will be described. Although a case where an alternating-current generator is a single-phase alternating-current generator will be described below as an example, the same description holds true for a case where the alternating-current generator is a three-phase alternating-current generator.

First Embodiment

Figure 1:
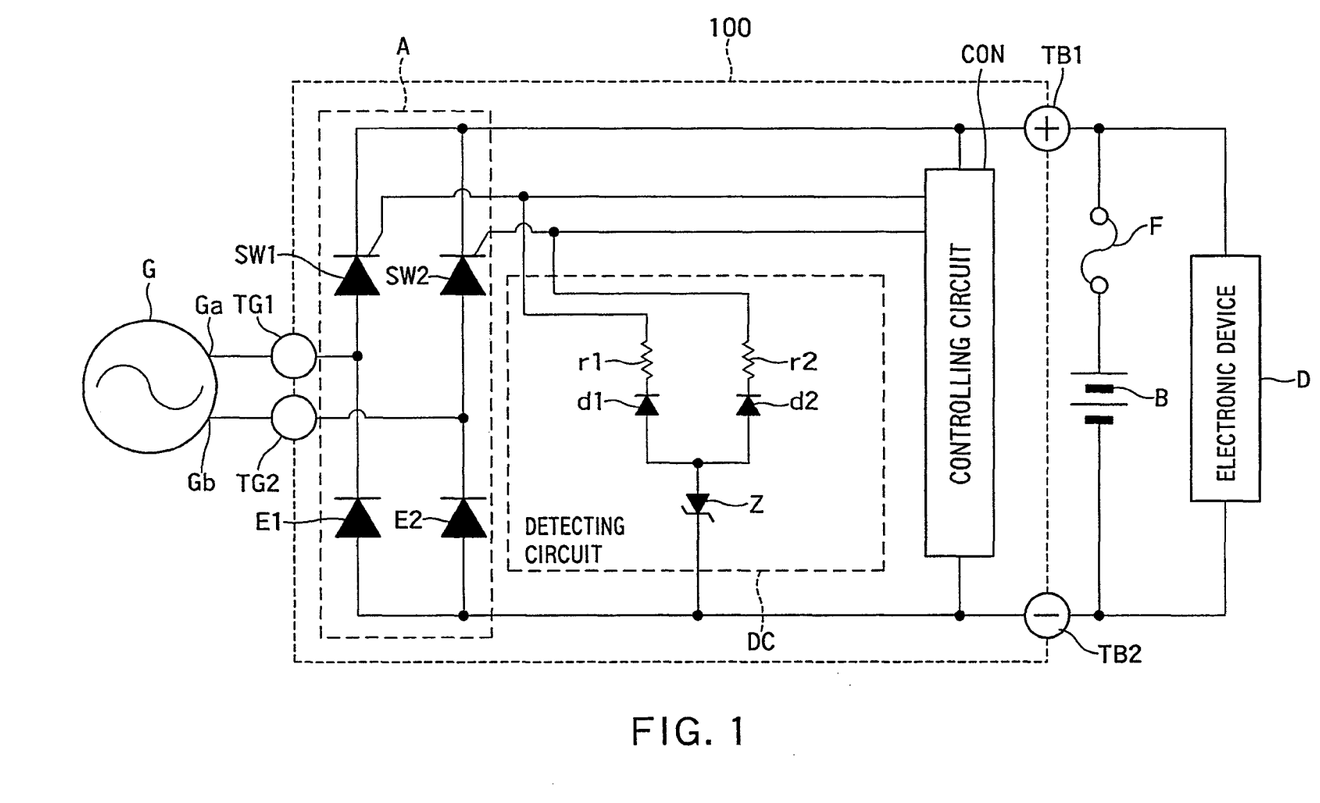
FIG. 1 is a circuit diagram showing an example of a configuration of a battery charging apparatus according to a first embodiment, which is an aspect of the present invention.

As shown in FIG. 1, an alternating-current generator "G" is configured to output an alternating-current voltage to a first output "Ga" and a second output "Gb". The battery charging apparatus 100 is configured to control charging of a battery "B" by the alternating-current generator "G". Electric power accumulated in the battery "B" is supplied to an electronic device "D" connected in parallel with the battery "B".

The battery charging apparatus 100 shown in FIG. 1 includes a first generator terminal "TG1" to which the first output "Ga" of the alternating-current generator "G" is connected, and a second generator terminal "TG2" to which the second output "Gb" of the alternating-current generator "G" is connected. The battery charging apparatus 100 further includes a first battery terminal "TB1" to which a positive electrode side of the battery "B" is connected, and a second battery terminal "TB2" to which a negative electrode side of the battery "B" is connected, the battery "B" and a fuse "F" being connected in series with each other between the first battery terminal "TB1" and the second battery terminal "TB2".

The battery charging apparatus 100 further includes a rectifying circuit "A" having a first switch element "SW1" connected to the first battery terminal "TB1" at one end thereof and to the first generator terminal "TG1" at another end thereof, a second switch element "SW2" connected to the first battery terminal "TB1" at one end thereof and to the second generator terminal "TG2" at another end thereof, a first rectifying element "E1" connected to the first generator terminal "TG1" at one end thereof and to the second battery terminal "TB2" at another end thereof, and a second rectifying element "E2" connected to the second generator terminal "TG2" at one end thereof and to the second battery terminal "TB2" at another end thereof.

The battery charging apparatus 100 further includes a detecting circuit "DC" that detects a reverse connection condition of the battery "B" in which the negative electrode side of the battery "B" is connected to the first battery terminal "TB1" and the positive electrode side of the battery "B" is connected to the second battery terminal "TB2", and controls either of the first switch element "SW1" and the second switch element "SW2" based on a result of the detection.

The battery charging apparatus 100 further includes a controlling circuit "CON" that controls the first switch element "SW1" and the second switch element "SW2" of the rectifying circuit "A" to rectify an output current of the alternating-current generator "G".

The battery "B" shown in FIG. 1 is normally connected to the battery charging apparatus 100. More specifically, when the battery "B" is normally connected, the positive electrode side of the battery "B" is connected to the first battery terminal "TB1" (via the fuse "F"). In addition, when the battery "B" is normally connected, the negative electrode side of the battery "B" is connected to the second battery terminal "TB2". The battery "B" and the fuse "F" are connected in series with each other between the first battery terminal "TB1" and the second battery terminal "TB2". The fuse "F" is designed to blow when a current equal to or greater than a prescribed value flows through the fuse "F".

The electronic device "D" is connected in parallel with the fuse "F" between the first battery terminal "TB1" and the second battery terminal "TB2".

In the example shown in FIG. 1, the fuse "F" is connected between the first battery terminal "TB1" and the positive electrode of the battery "B". Alternatively, however, the fuse "F" may be connected between the negative electrode of the battery "B" and the second battery terminal "TB2".

Figure 2:
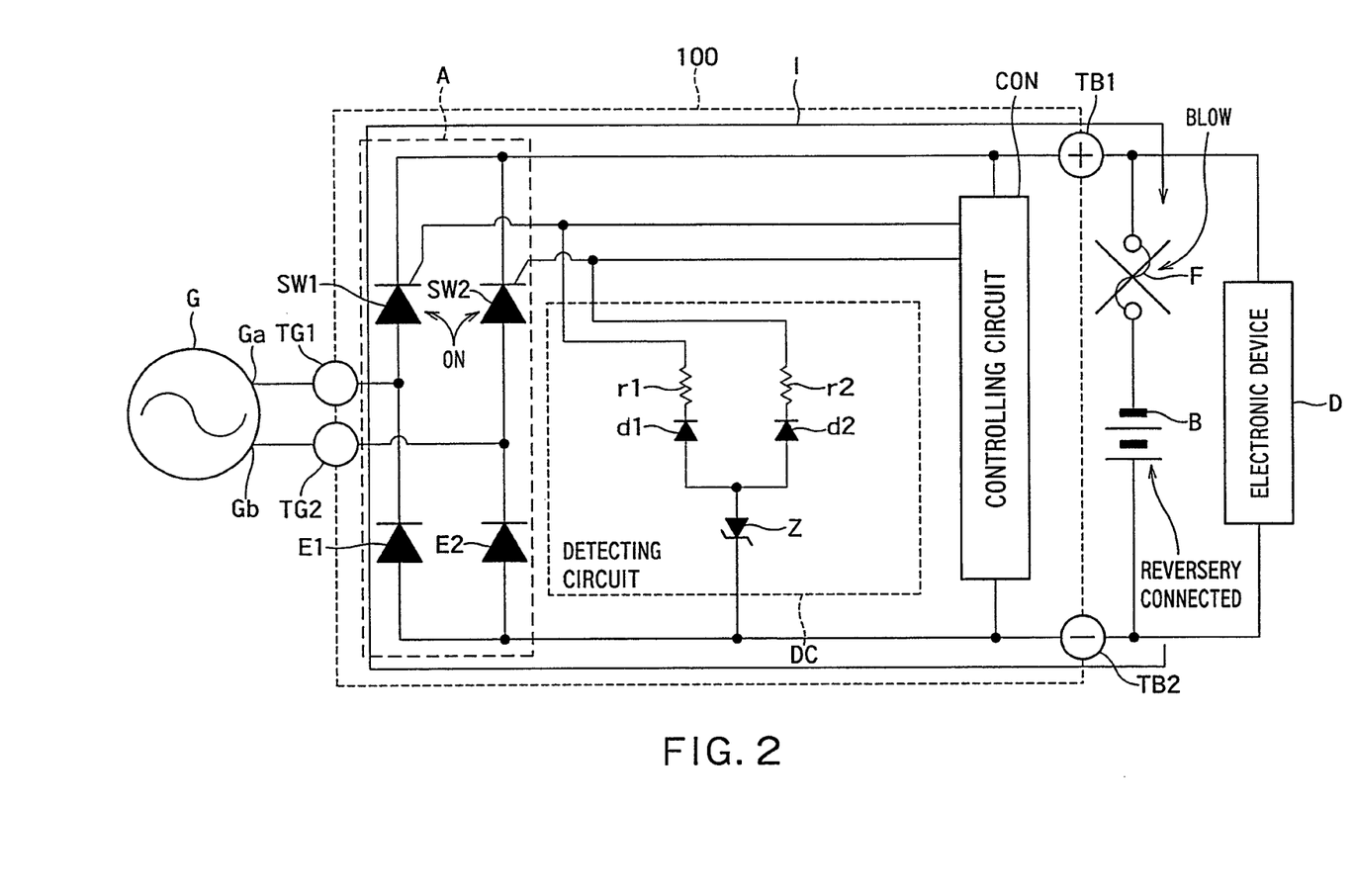
FIG. 2 is a diagram for illustrating an example of an operation of the battery charging apparatus shown in FIG. 1 in a case where a battery is reversely connected.

When the battery "B" is reversely connected in the opposite direction to the normal connection, the negative electrode side of the battery "B" is connected to the first battery terminal "TB1", and the positive electrode side of the battery "B" is connected to the second battery terminal "TB2" (FIG. 2).

As described above, the rectifying circuit "A" has the first switch element "SW1" connected to the first battery terminal "TB1" at one end thereof and to the first generator terminal "TG1" at another end thereof, the second switch element "SW2" connected to the first battery terminal "TB1" at one end thereof and to the second generator terminal "TG2" at another end thereof, the first rectifying element "E1" connected to the first generator terminal "TG1" at one end thereof and to the second battery terminal "TB2" at another end thereof, and the second rectifying element "E2" connected to the second generator terminal "TG2" at one end thereof and to the second battery terminal "TB2" at another end thereof.

The rectifying circuit "A" is configured to rectify the output current of the alternating-current generator "G" and output the rectified current to the first battery terminal "TB1".

As shown in FIG. 1, the first switch element "SW1" is a first thyristor connected to the first battery terminal "TB1" at a cathode thereof and to the first generator terminal "TG1" at an anode thereof, for example.

As shown in FIG. 1, the second switch element "SW2" is a second thyristor connected to the first battery terminal "TB1" at a cathode thereof and to the second generator terminal "TG2" at an anode thereof, for example.

As shown in FIG. 1, the first rectifying element "E1" is a first rectifying diode connected to the first generator terminal "TG1" at a cathode thereof and to the second battery terminal "TB2" at an anode thereof, for example.

As shown in FIG. 1, the second rectifying element "E2" is a second rectifying diode connected to the second generator terminal "TG2" at a cathode thereof and to the second battery terminal "TB2" at an anode thereof, for example.

The controlling circuit "CON" is configured to control the first switch element "SW1" and the second switch element "SW2" of the rectifying circuit "A" to rectify the output current of the alternating-current generator "G".

The controlling circuit "CON" is driven by at least the output current of the alternating-current generator "G".

In a case where the alternating-current generator "G" stops revolving and does not provide the output current, the controlling circuit "CON" stops controlling the first switch element "SW1" and the second switch element "SW2". As a result, the first switch element "SW1" and the second switch element "SW2" are turned off.

The detecting circuit "DC" is configured to detect the reverse connection condition of the battery "B" in which the negative electrode side of the battery "B" is connected to the first battery terminal "TB1" and the positive electrode side of the battery "B" is connected to the second battery terminal "TB2", and control either of the first switch element "SW1" and the second switch element "SW2" based on a result of the detection.

Alternatively, the detecting circuit "DC" may be configured to detect the reverse connection condition of the battery "B" in which the negative electrode side of the battery "B" is connected to the first battery terminal "TB1" and the positive electrode side of the battery "B" is connected to the second battery terminal "TB2", and control either of the first switch element "SW1" and the second switch element "SW2" based on a result of the detection.

The detecting circuit "DC" is configured to detect the reverse connection condition of the battery "B" by detecting that the polarity of the voltage at the first battery terminal "TB1" or the second battery terminal "TB2" is different from that in the normal connection condition.

For example, in the example shown in FIGS. 1 and 2, the polarity of the voltage at the second battery terminal "TB2" is negative in the normal connection condition and positive in the reverse connection condition. In this case, the detecting circuit "DC" detects the reverse connection condition of the battery "B" by detecting that the polarity of the voltage at the second battery terminal "TB2" is positive.

More specifically, the detecting circuit "DC" may be configured to detect the reverse connection condition of the battery "B" by detecting that the polarity of the voltage at the first battery terminal "TB1" or the second battery terminal "TB2" is different from that in the normal connection condition, and the magnitude of the voltage at the first battery terminal "TB1" or the second battery terminal "TB2" is equal to or greater than a preset threshold.

In that case, even if the voltage at the first battery terminal "TB1" or the second battery terminal "TB2" changes due to noise or the like, for example, the detecting circuit "DC" does not determine that the battery "B" is reversely connected if the magnitude of the voltage is lower than the threshold. That is, the possibility of erroneous detection of the reverse connection condition of the battery "B" by the detecting circuit "DC" due to noise or the like can be reduced.

When the detecting circuit "DC" detects the reverse connection condition of the battery "B", the detecting circuit "DC" forcedly turns on at least one of the first switch element "SW1" and the second switch element "SW2".

When the detecting circuit "DC" detects the reverse connection condition of the battery "B", the detecting circuit "DC" may forcedly turn on both the first switch element "SW1" and the second switch element "SW2".

In the case where both the first switch element "SW1" and the second switch element "SW2" are forcedly turned on, a current "I" flowing through the fuse "F" increases compared with the case where only one of the first switch element "SW1" and the second switch element "SW2" is turned on. That is, the fuse "F" can be made to blow with higher reliability.

The detecting circuit "DC" is configured to be driven by the current supplied from the battery "B" reversely connected, for example. The detecting circuit "DC" does not control the first switch element "SW1" and the second switch element "SW2" when the battery "B" is normally connected.

As shown in FIG. 1, the detecting circuit "DC" has a Zener diode "Z" connected to the second battery terminal "TB2" at a cathode thereof, a first detecting diode "d1" connected to the first thyristor (first switch element "SW1") at a cathode thereof and to an anode of the Zener diode "Z" at an anode thereof, and a second detecting diode "d2" connected to the second thyristor (second switch element "SW2") at a cathode thereof and to the anode of the Zener diode "Z" at an anode thereof, for example.

As shown in FIG. 1, the detecting circuit "DC" may further include a first detecting resistor "r1" connected between a gate of the first thyristor (first switch element "SW1") and the cathode of the first detecting diode "d1", and a second detecting resistor "r2" connected between a gate of the second thyristor (second switch element "SW2") and the cathode of the second detecting diode "d2", for example. In the example shown in FIG. 1, the Zener diode "Z" may be omitted as required.

The first detecting resistor "r1" may be connected between the anode of the first detecting diode "d1" and the anode of the Zener diode "Z". Similarly, the second detecting resistor "r2" may be connected between the anode of the second detecting diode "d2" and the anode of the Zener diode "Z".

When the battery "B" is reversely connected, if a voltage applied to the Zener diode "Z" exceeds a breakdown voltage, a current flows through the first detecting diode "d1" and the second detecting diode "d2". As a result, a control current is supplied to the gates of the first thyristor (first switch element "SW1") and the second thyristor (second switch element "SW2"), and the first thyristor (first switch element "SW1") and the second thyristor (second switch element "SW2") are turned on.

Next, an example of a method of controlling the battery charging apparatus 100 configured as described above will be described.

As described above, when the alternating-current generator "G" stops the output current, for example, the controlling circuit "CON" stops controlling the first switch elements "SW1" and the second switch element "SW2". As a result, the first switch element "SW1" and the second switch element "SW2" are turned off.

Once the switch elements are turned off, the detecting circuit "DC" is driven by the current supplied from the battery "B" reversely connected (FIG. 2).

The detecting circuit "DC" then detects the reverse connection condition of the battery "B" by detecting that the polarity of the voltage at the first battery terminal "TB1" or the second battery terminal "TB2" is different from that in the normal connection condition.

More specifically, the detecting circuit "DC" detects the reverse connection condition of the battery "B" by detecting that the polarity of the voltage at the first battery terminal "TB1" or the second battery terminal "TB2" is different from that in the normal connection condition, and the magnitude of the voltage at the first battery terminal "TB1" or the second battery terminal "TB2" is equal to or greater than the preset threshold.

Once the detecting circuit "DC" detects the reverse connection condition of the battery "B", the detecting circuit "DC" forcedly turns on at least one of the first switch element "SW1" and the second switch element "SW2".

In short, in a case where the controlling circuit "CON" stops controlling the first switch element "SW1" and the second switch element "SW2", and the first switch element "SW1" and the second switch element "SW2" are turned off, the detecting circuit "DC" forcedly turns on at least one of the first switch element "SW1" and the second switch element "SW2" when the detecting circuit "DC" detects the reverse connection condition of the battery "B".

In this way, when the battery "B" is reversely connected, a path through which the current "I" can flow to the fuse "F" is provided (FIG. 2). Then, the current "I" flows through the fuse "F" connected between the first battery terminal "TB1" and the second battery terminal "TB2" and makes the fuse "F" blow. As a result, application of a reverse voltage to the electronic device "D" is prevented.

As described above, the battery charging apparatus 100 according to an aspect of the present invention includes the detecting circuit "DC" that detects the reverse connection condition of the battery "B" in which the negative electrode side of the battery "B" is connected to the first battery terminal "TB1" and the positive electrode side of the battery "B" is connected to the second battery terminal "TB2", and controls either of the first switch element "SW1" and the second switch element "SW2" based on a result of the detection (FIG. 1).

And in the case where the controlling circuit "CON" stops controlling the first switch element "SW1" and the second switch element "SW2", and the first switch element "SW1" and the second switch element "SW2" are turned off, the detecting circuit "DC" forcedly turns on at least one of the first switch element "SW1" and the second switch element "SW2" when the detecting circuit "DC" detects the reverse connection condition of the battery "B".

In this way, when the battery "B" is reversely connected, a path through which the current "I" can flow to the fuse "F" is provided (FIG. 2). The current "I" makes the fuse "F" blow. As a result, application of a reverse voltage to the electronic device "D" is prevented.

Furthermore, any additional diode or the like is not required to provide a path through which the current "I" can flow to the fuse "F" when the battery "B" is reversely connected. Therefore, the manufacturing cost of the battery charging apparatus 100 can be reduced.

The embodiment is given for illustrative purposes, and the scope of the present invention is not limited thereto.

REFERENCE SIGNS LIST 100 a battery charging apparatus
"G" an alternating-current generator
"Ga" a first output
"TG1" a first generator terminal
"Gb" a second output
"TG2" a second generator terminal
"B" a battery
"TB1" a first battery terminal
"F" a fuse
"TB2" a second battery terminal
"SW1" a first switch element
"SW2" a second switch element
"E1" a first rectifying element
"E2" a second rectifying element
"A" a rectifying circuit
"DC" a detecting circuit
"CON" a controlling circuit

The invention claimed is:

1. A battery charging apparatus that controls charging of a battery by an alternating-current generator, comprising:
   a first generator terminal to which a first output of the alternating-current generator is connected;
   a second generator terminal to which a second output of the alternating-current generator is connected;
   a first battery terminal to which a positive electrode side of the battery is connected in a normal connection condition of the battery;
   a second battery terminal to which a negative electrode side of the battery is connected in the normal connection condition of the battery, the battery and a fuse being connected in series with each other between the first battery terminal and the second battery terminal;
   a rectifying circuit that has a first switch element connected to the first battery terminal at a first end thereof and to the first generator terminal at a second end thereof, a second switch element connected to the first battery terminal at a first end thereof and to the second generator terminal at a second end thereof, a first rectifying element connected to the first generator terminal at a first end thereof and to the second battery terminal at a second end thereof, and a second rectifying element connected to the second generator terminal at a first end thereof and to the second battery terminal at a second end thereof, rectifies an output current of the alternating-current generator and outputs the rectified output current to the first battery terminal;
   a detecting circuit that detects a reverse connection condition of the battery in which the negative electrode side of the battery is connected to the first battery terminal and the positive electrode side of the battery is connected to the second battery terminal, and controls either of the first switch element and the second switch element based on a detection result; and a controlling circuit that controls the first switch element and the second switch element of the rectifying circuit to rectify the output current of the alternating-current generator, wherein in a case when the controlling circuit stops controlling the first switch element and the second switch element, and the first switch element and the second switch element are turned off, the detecting circuit forcedly turns on at least one of the first switch element and the second switch element when the detecting circuit detects the reverse connection condition of the battery.

2. The battery charging apparatus according to claim 1, wherein the detecting circuit detects the reverse connection condition of the battery by detecting that a polarity of a voltage at the first battery terminal or the second battery terminal is different from the polarity in the normal connection condition.

3. The battery charging apparatus according to claim 2, wherein the detecting circuit detects the reverse connection condition of the battery by detecting that a magnitude of the voltage at the first battery terminal or the second battery terminal is equal to or greater than a preset threshold.

4. The battery charging apparatus according to claim 1, wherein in the case when the controlling circuit stops controlling the first switch element and the second switch element, and the first switch element and the second switch element are turned off, when the detecting circuit detects the reverse connection condition of the battery, the detecting circuit forcedly turns on either of the first switch element and the second switch element, thereby causing a current to flow to the fuse connected between the first battery terminal and the second battery terminal to make the fuse blow.

5. The battery charging apparatus according to claim 1, wherein the first switch element is a first thyristor connected to the first battery terminal at a cathode thereof and to the first generator terminal at an anode thereof, the second switch element is a second thyristor connected to the first battery terminal at a cathode thereof and to the second generator terminal at an anode thereof, the first rectifying element is a first rectifying diode connected to the first generator terminal at a cathode thereof and to the second battery terminal at an anode thereof, and the second rectifying element is a second rectifying diode connected to the second generator terminal at a cathode thereof and to the second battery terminal at an anode thereof.

6. The battery charging apparatus according to claim 5, wherein the detecting circuit has:

a Zener diode connected to the second battery terminal at a cathode thereof;

a first detecting diode connected to a gate of the first thyristor at a cathode thereof and to an anode of the Zener diode at an anode thereof; and a second detecting diode connected to a gate of the second thyristor at a cathode thereof and to the anode of the Zener diode at an anode thereof.

7. The battery charging apparatus according to claim 6, wherein the detecting circuit further has:

a first detecting resistor connected between the gate of the first thyristor and the cathode of the first detecting diode; and a second detecting resistor connected between the gate of the second thyristor and the cathode of the second detecting diode.

8. The battery charging apparatus according to claim 1, wherein an electronic device is connected in parallel with the fuse between the first battery terminal and the second battery terminal.

9. The battery charging apparatus according to claim 1, wherein in the case when the controlling circuit stops controlling the first switch element and the second switch element, and the first switch element and the second switch element are turned off, the detecting circuit forcedly turns on both the first switch element and the second switch element when the detecting circuit detects the reverse connection condition of the battery.

10. The battery charging apparatus according to claim 1, wherein the detecting circuit is driven by a current supplied from the battery reversely connected.

11. The battery charging apparatus according to claim 1, wherein the controlling circuit stops controlling the first switch element and the second switch element in a case when the alternating-current generator stops revolving and does not provide the output current.

12. The battery charging apparatus according to claim 1, wherein the controlling circuit is driven by at least the output current provided by the alternating-current generator.

13. The battery charging apparatus according to claim 1, wherein, in the normal connection condition of the battery, the detecting circuit does not control the first switch element and the second switch element.

14. A method of controlling a battery charging apparatus, the battery charging apparatus comprising: a first generator terminal to which a first output of the alternating-current generator is connected; a second generator terminal to which a second output of the alternating-current generator is connected; a first battery terminal to which a positive electrode side of the battery is connected in a normal connection condition of the battery; a second battery terminal to which a negative electrode side of the battery is connected in the normal connection condition of the battery, the battery and a fuse being connected in series with each other between the first battery terminal and the second battery terminal; a rectifying circuit that has a first switch element connected to the first battery terminal at a first end thereof and to the first generator terminal at a second end thereof, a second switch element connected to the first battery terminal at a first end thereof and to the second generator terminal at a second end thereof, a first rectifying element connected to the first generator terminal at a first end thereof and to the second battery terminal at a second end thereof, and a second rectifying element connected to the second generator terminal at a first end thereof and to the second battery terminal at a second end thereof, rectifies an output current of the alternating-current generator and outputs the rectified output current to the first battery terminal; a detecting circuit that detects a reverse connection condition of the battery in which the negative electrode side of the battery is connected to the first battery terminal and the positive electrode side of the battery is connected to the second battery terminal, and controls either of the first switch element and the second switch element based on a detection result; and a controlling circuit that controls the first switch element and the second switch element of the rectifying circuit to rectify the output current of the alternating-current generator, wherein in a case when the controlling circuit stops controlling the first switch element and the second switch element, and the first switch element and the second switch element are turned off, the detecting circuit forcedly turns on at least one of the first switch element and the second switch element when the detecting circuit detects the reverse connection condition of the battery.

* * * * *